E. C. OLIVER.
MECHANICAL COUNTER.
APPLICATION FILED NOV. 18, 1912.

1,171,535.

Patented Feb. 15, 1916.

WITNESSES:
Robert N. Van Bokirk
Virginia C. Spratt.

INVENTOR
Edd C. Oliver
BY Rahmond A. Parker
ATTORNEY

THE COLUMBIA PLANOGRAPH CO., WASHINGTON, D. C.

UNITED STATES PATENT OFFICE.

EDD C. OLIVER, OF DETROIT, MICHIGAN.

MECHANICAL COUNTER.

1,171,535.  Specification of Letters Patent.  Patented Feb. 15, 1916.

Application filed November 18, 1912. Serial No. 731,919.

*To all whom it may concern:*

Be it known that I, EDD C. OLIVER, a citizen of the United States, residing at Detroit, county of Wayne, State of Michigan, have invented a certain new and useful Improvement in Mechanical Counters, and declare the following to be a full, clear, and exact description of the same, such as will enable others skilled in the art to which it pertains to make and use the same, reference being had to the accompanying drawings, which form a part of this specification.

Figure 3:
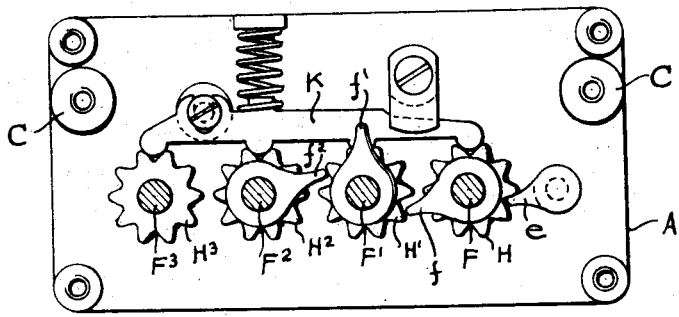
Figure 1:
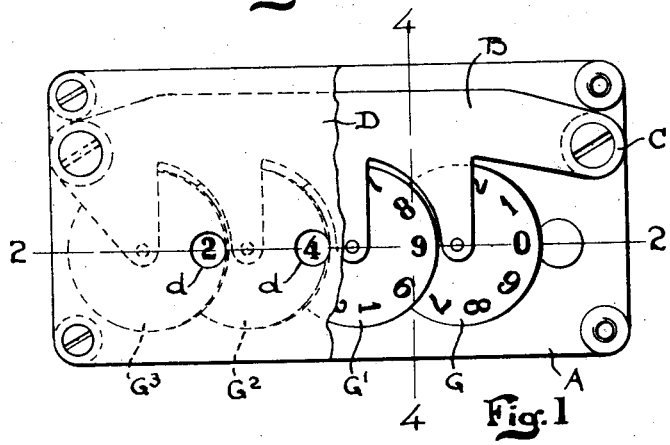
Figure 4:
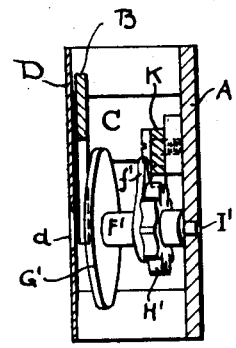
Figure 2:
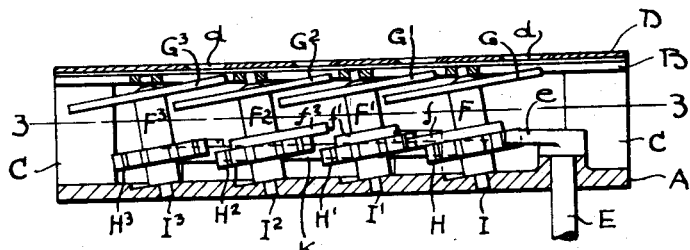

My invention relates to mechanical counters and has for an object to simplify and improve the construction of this class of devices. I secure this object in the device illustrated in the accompanying drawings, in which, Figure 1, is a plan view of an apparatus embodying my invention, the face plate being partly broken away. Fig. 2, is an elevation of the same, the plates being in section on the line 2—2 Fig. 1. Fig. 3, is a section in the plane indicated by the line 3—3 Fig. 2 looking from above. Fig. 4, is an elevation looking from the right of Fig. 1, the plates being in section on the line 4—4 Fig. 1 and the parts to the right of said section line removed.

A, is the base plate, and B, B is a plate parallel to the plate A supported upon standards C, C rising from the base plate A.

D, is a face plate located above the plate B and covering the entire mechanism except for sight apertures $d\ d\ d\ d$.

E, is a shaft, revolutions of which are to be counted.

$e$ is a finger upon the inner end of the shaft E.

F, $F^1$, $F^2$, $F^3$, are short parallel shafts resting in inclined positions in step bearings I, $I^1$, $I^2$, $I^3$, in the base plate A. The upper ends of the shafts F, $F^1$, $F^2$, $F^3$, rest in bearings in the plate B.

H, $H^1$, $H^2$, $H^3$, are star wheels secured upon the shafts F, $F^1$, $F^2$, $F^3$ in planes at right angles to said shafts.

$f$ is a finger similar to $e$ secured upon the shaft F and $f^1$ and $f^2$ are corresponding fingers upon the shafts $F^1$ and $F^2$ respectively. The finger $e$ engages a tooth of the star wheel H to turn said wheel, one tooth at each revolution of the shaft E. The fingers $f, f^1, f^2$, respectively, engage the star wheels H, $H^1$, $H^2$, $H^3$.

G, $G^1$, $G^2$, $G^3$ are disks secured to the shafts F, $F^1$, $F^2$, and $F^3$, at right angles to said shafts and having equally spaced numbers just within their peripheries upon their upper surfaces arranged to pass below the apertures $d\ d\ d\ d$.

K, is a pawl having teeth adapted to engage the star wheel H, $H^1$, $H^2$, $H^3$, to define the position of said wheels after each movement thereof.

The said apertures $d$ are so located that the highest part of the disks G, $G^1$, $G^2$, $G^3$ come below them and thus a number may be seen through each of said apertures and the number will be the same distance below each aperture.

By inclining the shafts F, $F^1$, $F^2$, $F^3$ as described, only one star wheel is used to each shaft and the construction of each shaft with its appurtenances is the same. Thus the disks G, $G^1$, $G^2$, $G^3$ do not interfere with each other and are placed in the same position on each of their shafts and bring the number at the proper distance and at a uniform distance below the sight apertures $d$. The star wheels H, $H^1$, $H^2$, $H^3$, are duplicates of each other and are located in the same position on each shaft, as are also the fingers $f, f^1, f^2, f^3$. The shafts F, $F^1$, $F^2$, $F^3$, with their attached wheels, fingers and disks have identically the same constructions so that the manufacture is cheapened and amplified and the parts accurately correspond and work together.

What I claim is:—

1. In a counter, a series of shafts, a star wheel on each of said shafts in a plane at right angles to the axis thereof, said shafts being so arranged that said star wheels shall be in different planes parallel to each other, and a single integral pawl extending in a single plane and engaging all of said star wheels.

2. In a counter, a series of shafts, a star wheel on each of said shafts in a plane at right angles to the axis thereof, said shafts being so arranged that said star wheels shall be in different planes parallel to each other, and a single integral pawl extending in a single plane and engaging all of said star wheels, each antecedent shaft being provided with a finger adapted to engage the star wheel on the following shaft.

In testimony whereof, I sign this specification in the presence of two witnesses.

EDD C. OLIVER.

Witnesses:
AGNES M. HIPKINS,
ELLIOTT J. STODDARD.

Copies of this patent may be obtained for five cents each, by addressing the "Commissioner of Patents, Washington, D. C."